(12) United States Patent
Hilb

(10) Patent No.: US 6,711,478 B2
(45) Date of Patent: Mar. 23, 2004

(54) RECEIVER-AUTONOMOUS VERTICAL INTEGRITY MONITORING

(75) Inventor: Robert C. Hilb, Anchorage, KY (US)

(73) Assignee: Garmin AT, Inc., Salem, OR (US)

( * ) Notice: Subject to any disclaimer, the term of this patent is extended or adjusted under 35 U.S.C. 154(b) by 4 days.

(21) Appl. No.: 10/016,511

(22) Filed: Dec. 10, 2001

(65) Prior Publication Data

US 2002/0077731 A1 Jun. 20, 2002

Related U.S. Application Data

(60) Provisional application No. 60/255,932, filed on Dec. 15, 2000.

(51) Int. Cl.[7] ............... G05D 1/04; G06F 7/00; G06F 19/00; G06F 165/00

(52) U.S. Cl. ............... 701/8; 701/207; 340/970; 342/38; 342/450

(58) Field of Search ............... 701/3, 4, 7–9, 701/207, 213–216, 221, 14–301; 340/436, 438, 970, 945, 963; 342/455, 450, 357.08, 357.06, 38, 357.01–357.04, 375.12, 357.14

(56) References Cited

U.S. PATENT DOCUMENTS

| | | | |
|---|---|---|---|
| 5,839,080 A | * 11/1998 | Muller et al. | 701/9 |
| 5,923,286 A | 7/1999 | Divakaruni | |
| 5,969,670 A | * 10/1999 | Kalafus et al. | 342/357.02 |
| 6,094,607 A | * 7/2000 | Diesel | 701/4 |
| 6,259,380 B1 | * 7/2001 | Jensen | 340/970 |
| 6,281,836 B1 | 8/2001 | Lupash et al. | |
| 6,317,688 B1 | 11/2001 | Bruckner et al. | |
| 2001/0013836 A1 | * 8/2001 | Cowie | 340/961 |
| 2002/0072832 A1 | * 6/2002 | Bachinski et al. | 701/4 |
| 2002/0198657 A1 | * 12/2002 | Robbins | 701/214 |

FOREIGN PATENT DOCUMENTS

WO    WO 97/02495    1/1997

* cited by examiner

Primary Examiner—Thomas G. Black
Assistant Examiner—Ronnie Mancho
(74) Attorney, Agent, or Firm—Devon A. Rolf

(57) ABSTRACT

A system and method for determining the vertical integrity of an altitude component of an aircraft navigational signal through the use of a receiver-autonomous vertical integrity monitoring (RAVIM) algorithm. The system and methods also provide timely warning to vehicle operators if the integrity of the signal is unacceptable or unknown. The system and methods are capable of determining the vertical integrity of an incoming signal without relying upon data embedded within the incoming signal itself. In addition, the system and methods of the present invention provide vertical integrity to vehicle operators in instances, such as when the specific aircraft navigational signal is not operating, when the specific aircraft navigational signal is not available in a particular region, or when an aircraft is operating outside the geographic area covered by the specific aircraft navigational signal system.

19 Claims, 5 Drawing Sheets

RECEIVER-AUTONOMOUS VERTICAL INTEGRITY MONITORING

CROSS-REFERENCE TO RELATED APPLICATIONS

The present application claims priority from U.S. Provisional Patent Application Serial No. 60/255,932, filed on Dec. 15, 2000, the contents of which are incorporated by reference.

FIELD OF THE INVENTION

The present invention relates generally to the field of aircraft navigation systems. More particularly, the invention includes a method and system for determining the vertical integrity of a broadcast signal, in particular a WAAS-enhanced GPS signal, without relying upon data embedded within the broadcast signal itself.

BACKGROUND OF THE INVENTION

High-quality navigational data is critical for safe flight, especially given the increase in air traffic worldwide. Aircraft navigation has evolved to depend more and more upon signals from orbiting satellites. Satellite guidance offers increased precision over traditional ground-based methods, but brings with it a host of technical challenges. Updated on-board avionics devices, from receivers to cockpit displays, require position data that is highly accurate, widely available, and continuously monitored to ensure its integrity.

The Global Positioning System (GPS) is a network of satellites initiated by the United States Department of Defense. A mobile vehicle such as an aircraft equipped with a GPS receiver can determine its precise three-dimensional position (latitude, longitude, and altitude) relative to the center of the earth. An aircraft equipped with a GPS receiver can use the signals as an aid to navigation.

When the GPS network was first commissioned, the Department of Defense, for national security reasons, intentionally introduced artificial errors into the signal in order to deny access by unauthorized users. This protection technique was known as Selective Availability (SA). Recently, however, SA has been removed and the GPS signal is available to its full precision.

Even with SA removed, however, an unenhanced GPS signal is not accurate enough for an aircraft to use when making a precision approach. Another concern is signal integrity or trustworthiness. A problem with a GPS satellite or a defect in its signal may go undetected until the satellite passes directly over a ground monitoring station, which could take an hour or more, depending upon the satellite's orbit.

The Wide Area Augmentation System (WAAS) has been designed to solve both the accuracy and integrity problems of GPS by enhancing the signal. A WAAS-enhanced GPS signal (typically known as a WAAS signal) will improve the availability, accuracy, and integrity of the basic GPS signal. WAAS includes a network of about 25 ground reference stations that constantly receive signals from the GPS satellites and relay the data to a wide-area master station (WMS). The WMS analyzes the incoming GPS signals, executes correction algorithms, and then sends a message to one or more geostationary communication satellites in orbit above North America. The satellites then broadcast the corrected data on the same frequency as GPS to receivers on board aircraft within the WAAS coverage area.

In addition to the GPS data, the WMS message includes an error-correction component and an integrity component. The error-correction component corrects GPS signal errors caused by ionospheric disturbances, timing errors, and satellite orbit errors. The integrity component includes the results of one or more checking and cross-checking algorithms executed by the WMS to confirm the reliability or soundness of the GPS signal data. The integrity component is broadcast often enough to enable a receiver to detect any integrity fault within six seconds or less.

The integrity component of the WAAS signal, however, is currently not available on a consistent basis. While WAAS has been broadcasting since mid-1999, WAAS will not be fully operational, with integrity, for precision approaches until 2003 or perhaps later.

Currently, the WAAS signal includes three-dimensional position data (latitude, longitude, and altitude), but it does not include the integrity component. Thus, while the user is receiving position data that may be highly accurate, the user has no way of confirming whether the position data has integrity. Without integrity, the data cannot be relied upon for safety-sensitive tasks such as precision approaches.

Horizontal integrity can be obtained from executing an algorithm within the on-board receiver itself. The algorithm, generally referred to as the Receiver-Autonomous Integrity Monitoring (RAIM) algorithm, is a mathematical procedure using redundant range measurements from a number of satellites to confirm whether the horizontal position data being broadcast from any one of the satellites is faulty. The RAIM algorithm uses at least one additional satellite signal to check and cross-check the data. When an extra satellite is not available, the RAIM algorithm can use the reading from a barometric altimeter.

Vertical integrity, on the other hand, cannot be obtained by using data from additional satellites in a RAIM-type algorithm. The GPS satellites simply do not provide sufficient accuracy in the vertical direction. Thus, there is a need for a system and method for determining the vertical integrity of a WAAS signal.

Three elements are essential for safe and useful position data: accuracy, availability, and integrity. Accuracy requirements, generally, are met by the WAAS signal. Availability within the WAAS coverage area is provided by at least two geostationary communication satellites. Integrity information about the validity of the WAAS signal is currently not available on a consistent basis. As previously discussed, WAAS will not be fully operational for precision approaches until 2003 or perhaps later. Even when WAAS becomes fully operational, including the broadcast of reliable integrity information, there may be times when the integrity component of a WAAS signal is not available in a particular area. For example, the WAAS signal is not available in certain coastal regions of North America. Moreover, other countries are developing and implementing systems that are similar in structure and function to WAAS, but may not always be compatible with the on-board equipment available. Thus, there is a need for a method and system for determining the integrity of a WAAS signal without relying upon data embedded within the WAAS signal itself.

A signal has integrity if it is complete and free from defects or decay over time. Integrity is found by checking the data within a signal and cross-checking it with other reliable data.

A navigation system has integrity if the data it receives is accompanied by information about its integrity or, alternatively, the system itself is capable of analyzing the integrity of the incoming data. A safe and reliable navigation system is capable of providing a variety of timely warnings to the user about data integrity, including a warning or command to disregard the data completely if and when data integrity is outside an acceptable margin of error or lost altogether.

Thus, there is a need for a method for determining the vertical integrity of a WAAS signal. There is a further need for a system for providing timely warnings to pilots and other users about the vertical integrity of a WAAS signal.

Because WAAS does not currently broadcast integrity data, there is a need for a method and system for determining the vertical integrity of a WAAS signal without relying upon data embedded within the WAAS signal itself. In other words, there is a need for an autonomous method for determining vertical integrity.

Even at a point in time when the WAAS signal includes integrity data, there will continue to be a need for an autonomous method and system for determining vertical integrity. This would include, but not be limited to, instances in when the WAAS signal is not operating, when the WAAS signal is not available in a particular region, or when an aircraft is operating outside the geographic area covered by WAAS.

There is a further need for developing various criteria and mathematical algorithms to be executed by the on-board receiver or other equipment for determining the vertical integrity of a WAAS signal. There is still a further need for integrating the vertical integrity result into a system for displaying navigation data—supported by and including the vertical integrity data—in the cockpit. The need for displaying integrity includes the need for providing a variety of timely and distinct warnings to the user about the vertical integrity, including a warning or command to disregard the WAAS data completely if and when the vertical integrity is outside an acceptable margin of error or lost altogether.

SUMMARY OF THE INVENTION

The present invention provides for methods and systems for determining the vertical integrity of an aircraft navigation signal without relying upon data embedded within the signal itself. In one specific embodiment, the invention provides for methods and systems for determining the vertical integrity of a WAAS-enhanced GPS signal without relying upon data embedded within the WAAS signal.

The invention provides a method for using an independent altitude reading to assess the vertical integrity of an incoming aircraft navigational signal. In one embodiment, the reading from a barometric altimeter is used in a receiver-autonomous vertical integrity monitoring (RAVIM) algorithm to check the accuracy of the altitude reading in the incoming aircraft navigational signal. It is also possible to implement the RAVIM algorithm to assess the vertical integrity of the independent altitude reading (i.e., the barometric signal) once vertical integrity of the incoming signal has been established.

One aspect of the present invention includes a set of rules within a RAVIM algorithm to continuously monitor and assess the vertical integrity of the aircraft navigational signal. In one embodiment, the RAVIM algorithm calculates the difference between the independent altitude reading and the altitude reading in the incoming aircraft navigational signal. The difference between the two readings is known as the vertical position error. The vertical position error is compared to a pre-determined allowable vertical error, otherwise known as the vertical alarm limit (VAL). If the vertical position error does not exceed VAL, the altitude in the incoming signal is determined to have acceptable integrity. Otherwise, if the vertical position error exceeds the VAL, the incoming signal altitude has unacceptable or unknown integrity and the user is warned and, in appropriate cases, commanded to disregard the incoming signal altitude.

In another embodiment of the invention, typically executed in the context of a precision approach to landing or other vehicle maneuver, the RAVIM algorithm calculates first and second variances. The first variance being calculated is the difference between the independent altitude reading and the calculated altitude required to perform the precision maneuver. The second variance being calculated is the difference between the altitude reading in the incoming signal and the calculated altitude required to perform the precision maneuver. In one embodiment of the invention, the RAVIM algorithm calculates the calculated altitude based on known parameters, such as maneuver path angle, points along the maneuver path and time elapsed between maneuver path points. The absolute value of the difference between the first and second variances is known as the vertical position error. The vertical position error is then compared to a predetermined allowable vertical error, otherwise known as the vertical alarm limit (VAL). If the vertical position error does not exceed the VAL, the altitude in the incoming signal has acceptable integrity. Otherwise, if the vertical position error exceeds the VAL, the altitude in the incoming signal has unacceptable or unknown integrity and the user is warned and, in appropriate cases, commanded to disregard the altitude in the incoming signal.

By collecting a variety of incoming data from different sources, the RAVIM algorithm and processor is capable of calculating variances and supplying vertical integrity monitoring in a variety of environments and contexts, such as the precision approach. The architecture of the RAVIM algorithm and processor is designed to allow the comparison and analysis of different data streams for integrity depending upon the context of the flight maneuver and the aircraft's navigation needs. Thus, the RAVIM algorithm and processor is capable of calculating a value to compare to the vertical alarm limit (VAL) which is appropriate to the context in which the vertical integrity information is needed.

According to another aspect of the present invention, the value of the VAL can be optimized based upon the certified accuracy of the barometric altimeter in use, the known error rates in the incoming signal, other quantifiable characteristics of the avionics equipment in use, and the regulations governing flight and navigation.

In one embodiment, the RAVIM algorithm is executed by computer software in the incoming signal receiver, such as a WAAS receiver, although the RAVIM algorithm may also be implemented in other auxiliary hardware.

The RAVIM algorithm of the present invention may also include a continuous internal consistency check during the comparison of the vertical position error to the VAL. The internal consistency check may also generate error values which, when compared to internal error limits, may cause an internal failure alarm. In such instances, the algorithm cannot perform an acceptable integrity calculation and, accordingly, the user is warned that the altitude in the incoming signal has unacceptable or unknown integrity.

In accordance with yet another embodiment of the present invention, additional computer instructions or another system for processing and implementing the RAVIM algorithm described herein may be incorporated in a vertical integrity monitoring system in order to provide accurate and timely warnings to system users, typically vehicle operators, regarding the state of vertical integrity. In one embodiment, the displays and warnings are consistent with those being currently offered. Thus, implementation and use of the RAVIM algorithm will not require additional user training.

In another aspect of the present invention, the RAVIM algorithm provides vertical integrity in any operating environment. For example, until WAAS integrity is available, the RAVIM algorithm provides vertical integrity for an otherwise unconfirmed WAAS signal. When WAAS integrity becomes available, the RAVIM algorithm may operate as an additional or backup check. If and when vertical integrity is provided by augmentation systems similar to WAAS in other countries, the RAVIM algorithm may also operate in this environment as an additional or backup check.

Thus, embodiments of the present invention provide a method for determining the vertical integrity of the altitude component of an incoming signal and a system for providing vertical integrity information to the user in any operating environment. Embodiments of the present invention further provide a receiver-autonomous vertical integrity monitoring (RAVIM) algorithm for assessing the vertical integrity of a WAAS signal. The autonomy of the algorithm provides vertical integrity without reliance upon integrity data, which may or may not be embedded within the WAAS signal itself. Thus, the present invention provides precision vertical guidance, with integrity, in cases where the incoming signal does not contain integrity data.

Embodiments of the present invention further provide a method and system for continuously informing the user about the status of the vertical integrity of the incoming signal. Through displays and warnings, the user is notified if the vertical position error exceeds the pre-determined vertical alarm limit and warned to disregard the altitude component of the incoming signal when the vertical integrity is insufficient for any reason.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
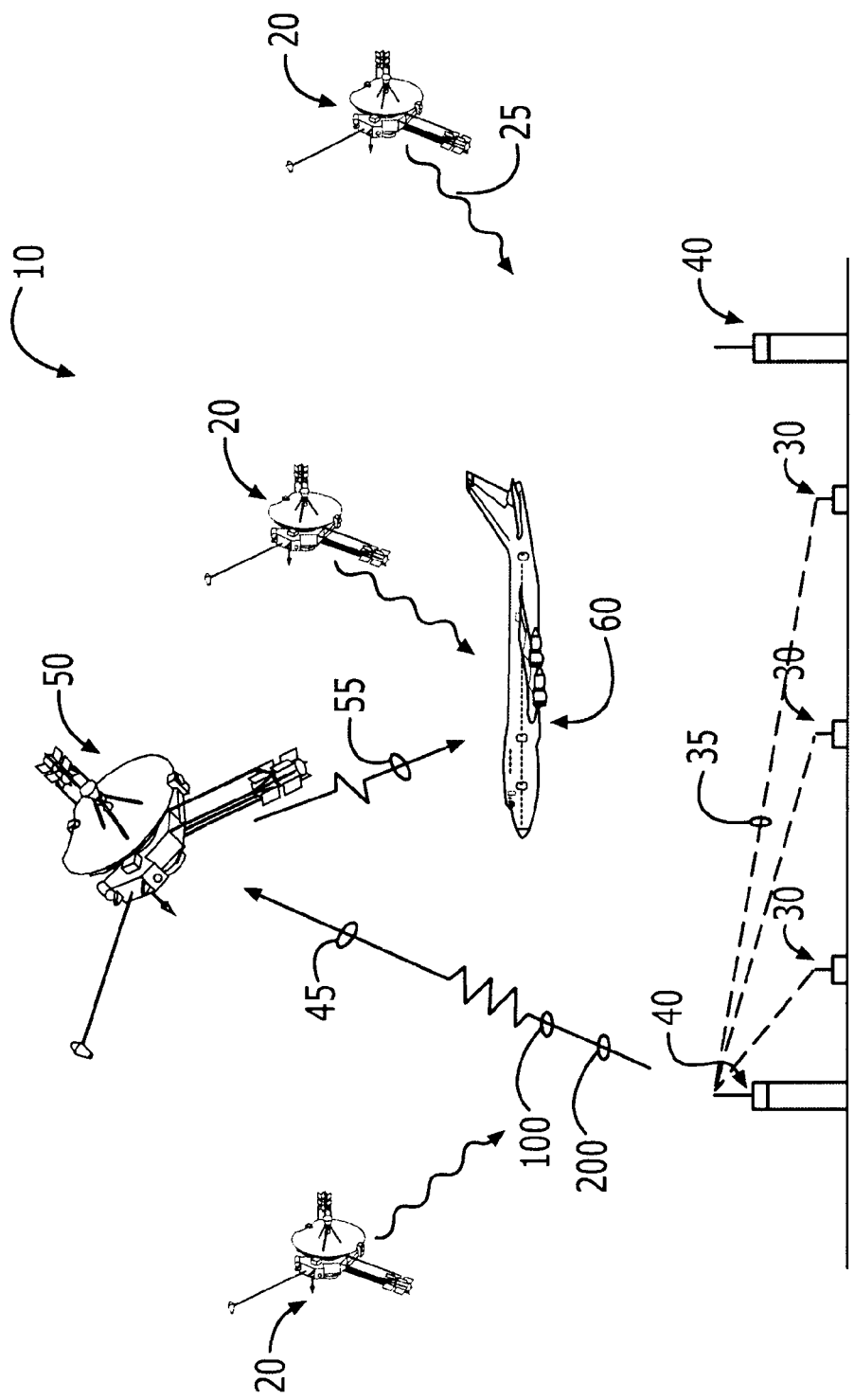
FIG. 1 illustrates a schematic drawing of a Wide Area Augmentation System (WAAS) implemented in an aircraft environment, in accordance with the prior art.

FIG. 1 illustrates a schematic representation of the various components of the Wide Area Augmentation System (WAAS) 10. WAAS is an example of an aircraft navigational broadcast system in which the broadcast signal has an altitude component, other navigational broadcast systems having altitude components are also suitable for vertical integrity and are within the inventive concepts herein disclosed. An existing array of GPS satellites 20 continuously broadcast a GPS signal 25 to an array of ground-based reference stations 30. The ground-based reference stations 30 broadcast a relay signal 35 to one or more wide-area master stations (WMS) 40. The WMS 40 analyzes the incoming relay signal 35, executes one ore more correction algorithms, and then sends a message 45 to one or more geostationary communication satellites 50 in orbit above earth. The satellites 50 then broadcast the corrected GPS signal 55 to receivers on board aircraft 60 within the WAAS coverage area. The WMS message 45 includes within it an error-correction component 100 and an integrity component 200

Figure 2:
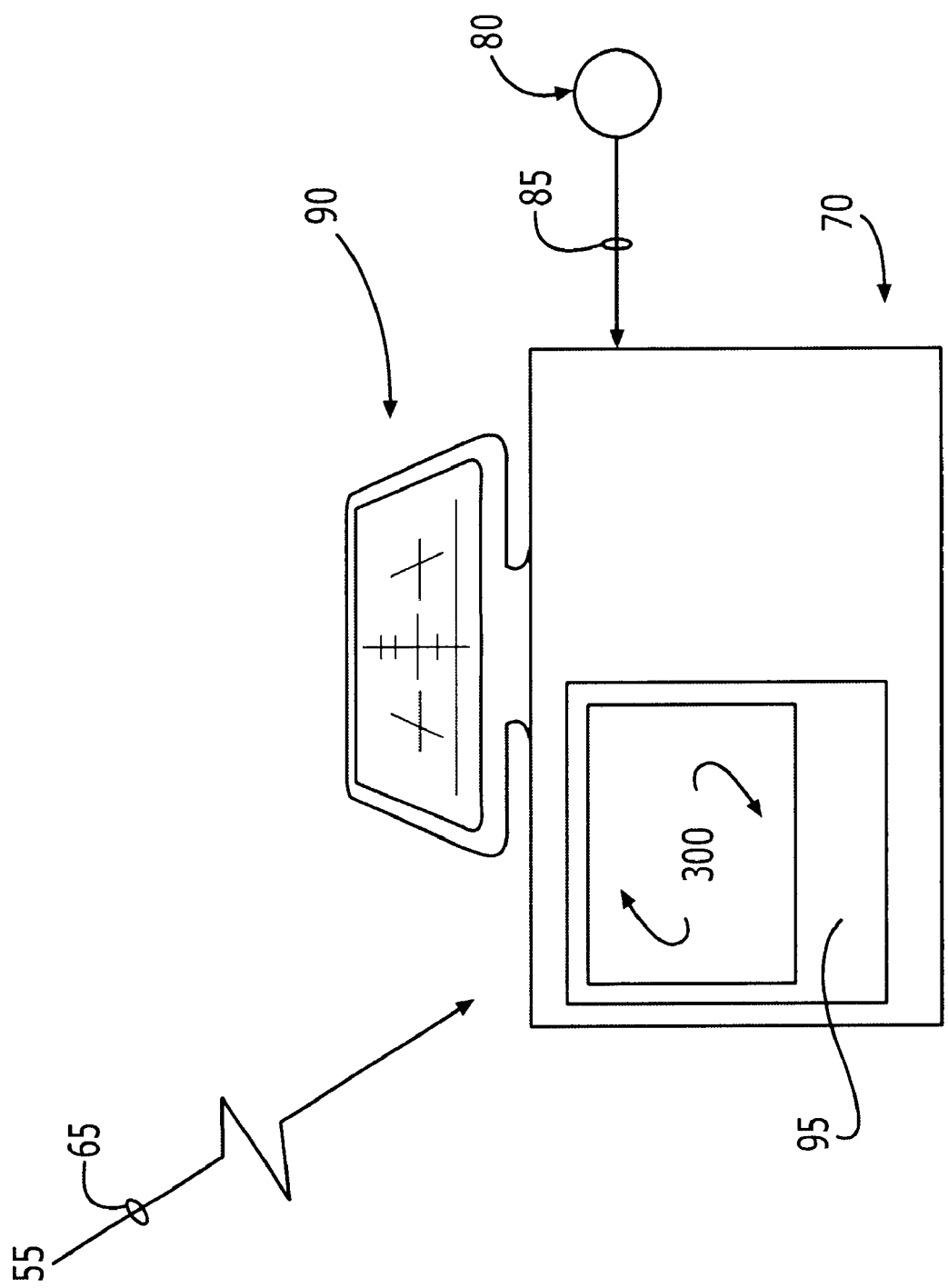
FIG. 2 shows a schematic drawing of hardware related to a Receiver-Autonomous Vertical Integrity Monitoring (RAVIM) system, in accordance with an embodiment of the present invention.

FIG. 2 is a schematic representation of an on-board aircraft navigational signal receiver 70, such as a WAAS receiver, and an associated on-board display 90, in accordance with an embodiment of the present invention. The corrected GPS signal 55, including a WAAS altitude reading 65, is received by an on-board WAAS receiver 70. The receiver-autonomous vertical integrity monitoring (RAVIM) algorithm 300 of the present invention is executed by computer software or other processing device within the receiver 70. In one embodiment of the present invention, the RAVIM algorithm 300 calculates the difference between an independent altitude reading 85 and the altitude reading 65 in the incoming signal. The independent altitude reading is transmitted from an altitude source 80, such as barometric altitude source or the like. The RAVIM algorithm 300 is typically embodied in computer software executed in the aircraft navigational signal receiver by an appropriate processor 95. It is also possible for the RAVIM algorithm to be executed outside of the confines of the aircraft navigational receiver.

Figure 3:
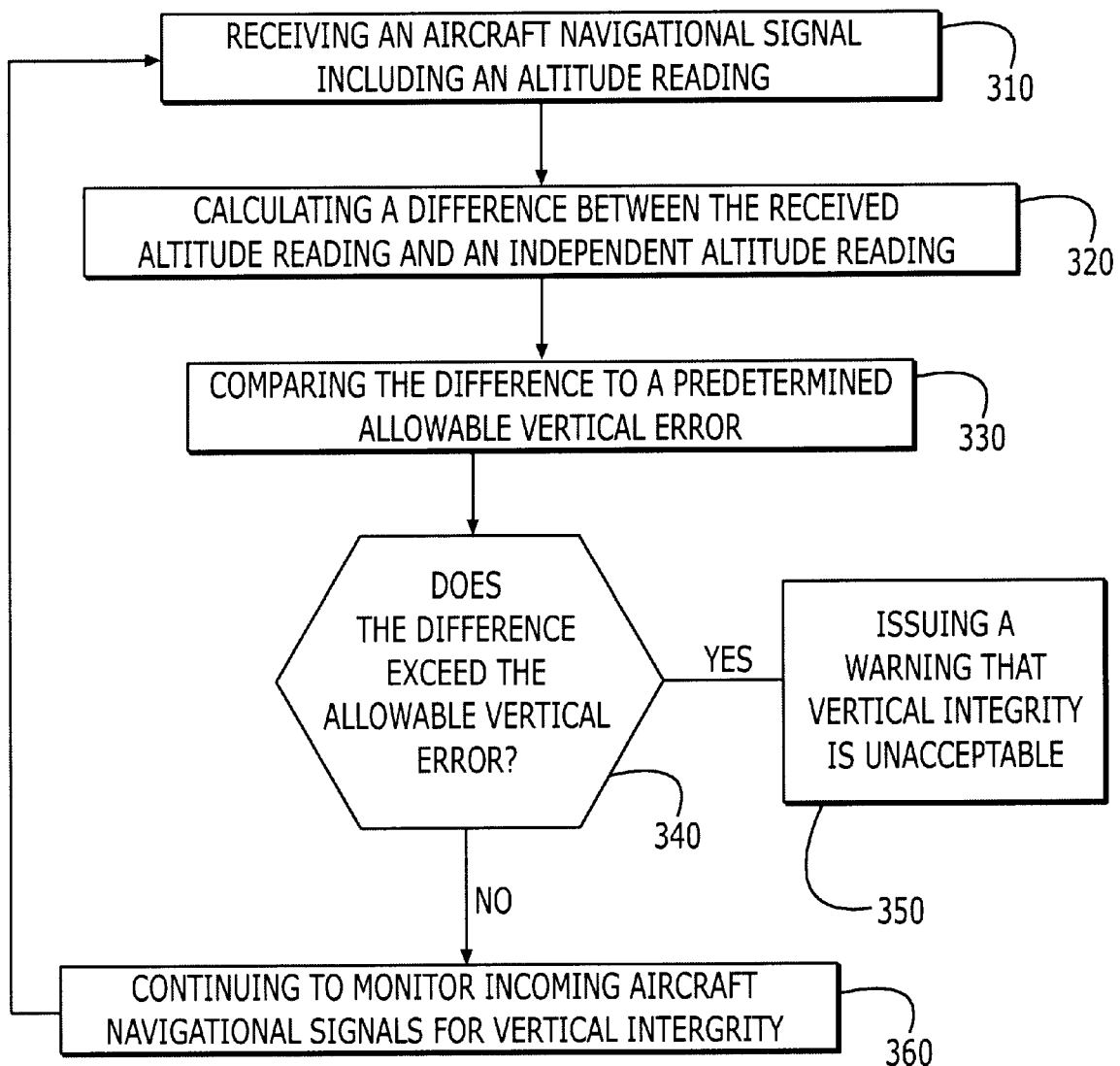
FIG. 3 depicts a flow diagram of a method for Receiver-Autonomous Vertical Integrity Monitoring, in accordance with an embodiment of the present invention.

FIG. 3 is a flow diagram of a method for receiver-autonomous vertical integrity monitoring, in accordance with an embodiment of the present invention. At step 310, an aircraft navigational signal, including an altitude reading is received by an aircraft navigational signal receiver. Typically the aircraft navigational signal receiver will be located on-board an aircraft, although the receiver may be located on-board any other vehicle or at a ground-based station. At step 320, the receiver invokes the RAVIM algorithm, which calculates a difference between the incoming signal altitude reading and an independent altitude reading. Typically, the independent altitude reading will be rendered from a barometric altimeter on-board the aircraft or vehicle. The difference between the incoming signal altitude reading and the independent altitude reading is commonly referred to in the art as the vertical position error.

At step 330, the vertical position error is compared to a pre-determined allowable vertical error, otherwise known as the vertical alarm limit (VAL). The VAL is typically determined based upon the instruments in use and specific governing regulations. For example, the VAL value can be determined and optimized based upon the certified accuracy of the instrument providing the independent altitude reading, the known error rates in the incoming signal, other quantifiable characteristics of the vehicle equipment in use, and/or the regulations governing vehicle movement. A determination is made at step 340 to assess whether the vertical position error exceeds the VAL. If the determination is made that the vertical position error does exceed the VAL then, at step 350, a warning is issued alerting the user (i.e., pilot, vehicle operator, ground station attendant) that the vertical integrity of the incoming signal is unacceptable or unknown. The warning may come in any acceptable format including, but not limited to, an audible warning and/or a visible warning. If the determination is made that the vertical position error does not exceed the VAL then, at step 360, the incoming signal vertical integrity is deemed acceptable and continuous monitoring/checking of vertical integrity occurs for all incoming signals.

Figure 4:
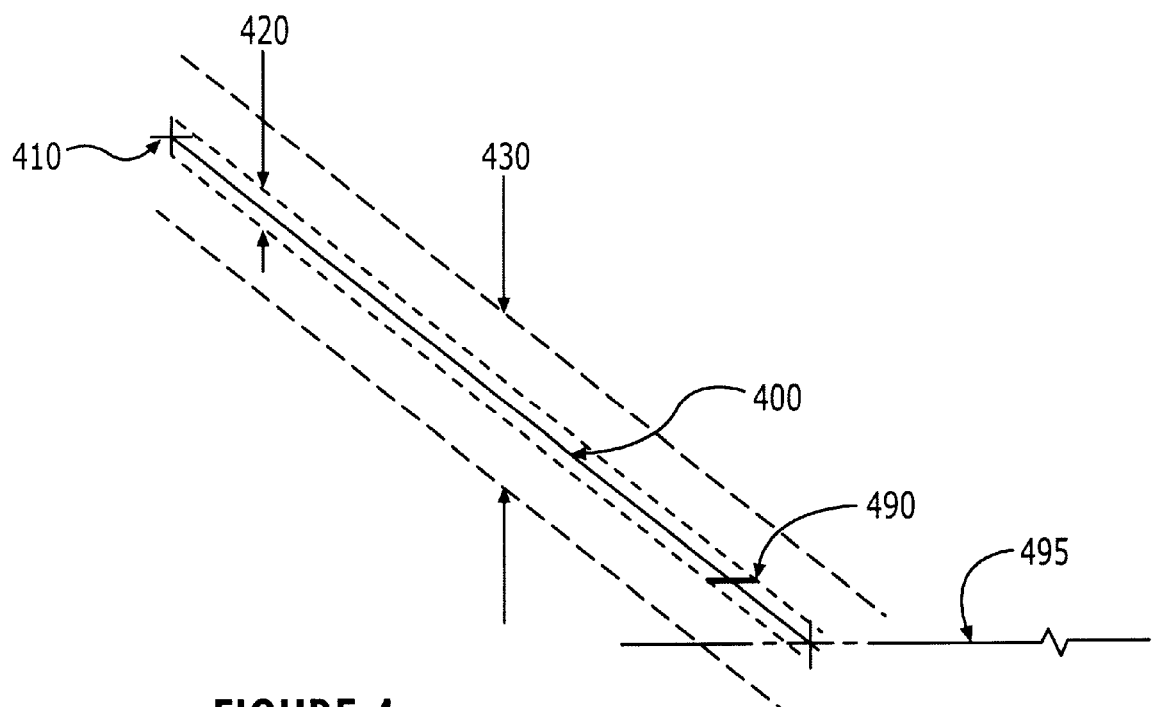
FIG. 4 illustrates a schematic drawing of a flight path with upper and lower vertical limits, in accordance with an embodiment of the present invention.

In accordance with an alternate embodiment of the present invention, a method for receiver-autonomous vertical integrity monitoring that is executed in the context of a specific aircraft or vehicle maneuver is described herein. Such a method insures that the aircraft or vehicle remains on course. For example, this method may be used for a precision aircraft approach landing along a glide path. FIG. 4 illustrates an example of an aircraft glide path 400. The glide path 400 is generally defined as the path between the pre-determined point in the sky called the Final Approach Fix (FAF) 410 and the Missed Approach Point (MAP) 490 on the runway 495. The measured vertical position error is shown as an error range 420 above and below the glide path 400. Similarly, the predetermined Vertical Alarm Limit (VAL) is shown as a boundary 430 above and below the glide path 400. The VAL boundary 430 represents the acceptable limit of vertical integrity for the particular maneuver being executed.

Figure 5:
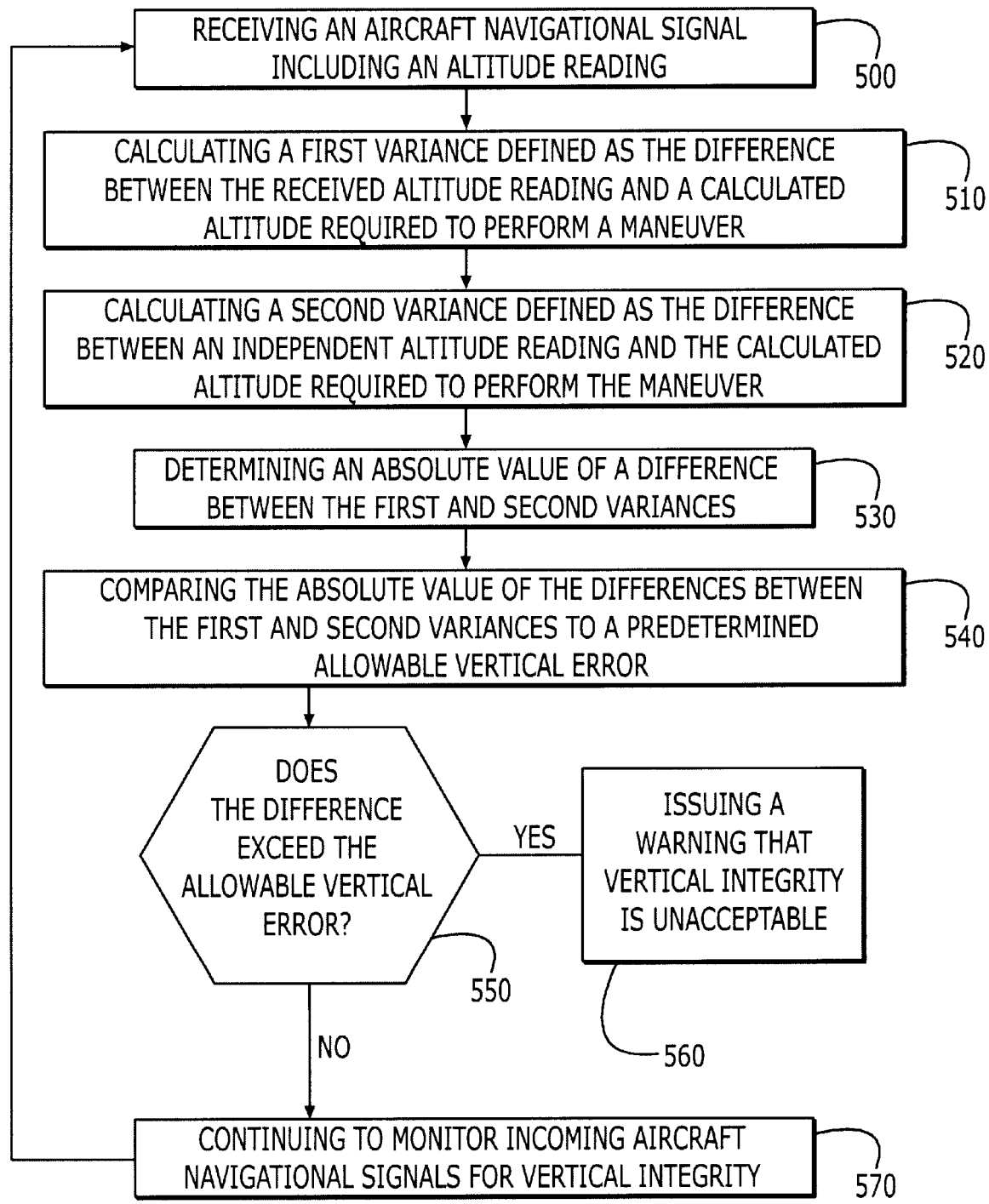
FIG. 5 depicts a flow diagram of an alternate method for Receiver-Autonomous Vertical Integrity Monitoring, in accordance with an embodiment of the present invention.

FIG. 5 is a flow diagram of the alternate method for receiver-autonomous vertical integrity monitoring executed in the context of a specific aircraft or vehicle maneuver, in accordance with an embodiment of the present invention. At step 500, an aircraft navigational signal, including an altitude reading is received by an aircraft navigational signal receiver. Typically the receiver will be located on-board an aircraft, although the receiver may be located on-board any other maneuverable vehicle or at a ground-based station.

At steps 510 and 520, the receiver invokes the RAVIM algorithm to calculate two values known as variances. The first variance, calculated at step 510, is defined as the difference between an independent altitude reading and the calculated altitude required to perform the maneuver. Typically, the independent altitude reading will be rendered from a barometric altimeter on-board the aircraft or vehicle. The calculated altitude required to perform the maneuver is derived from altitude readings stored in an associated database. The second variance, calculated at step 520, is defined as the difference between the altitude reading of the incoming signal and the calculated altitude required to perform the maneuver.

The calculated altitude required to perform the maneuver may be provided by the RAVIM algorithm or may be derived outside of RAVIM environment by an ancillary algorithm. The calculated altitude is derived from known position data. For the application shown in FIG. 4, the known position data includes the glide path angle, theta, (defined by the FAF 410, the MAP 490 and the runway 495) and the aircraft's position at some point "A" along the glide path. Additionally, at some later point "B", the time elapsed from point "A" to point "B" known and the horizontal distance traveled is known. The horizontal distance traveled is typically known to a high degree of accuracy by implementing a horizontal receiver-autonomous integrity monitoring algorithm. Using these parameters the RAVIM algorithm or an ancillary algorithm can provide a calculated altitude that represents the altitude at which the aircraft should be flying at point "B" along the glide path. Use of the calculated altitude within the RAVIM algorithm may provide additional accuracy for a precision aircraft approach or other vehicle maneuver.

At step 530, the absolute value of the difference between the first and second two variances is calculated, this difference is commonly referred to as the vertical position error. It should be noted that if one of the variances is zero the absolute value of the non-zero variance becomes the vertical position error. The vertical position error is then, at step 540, compared to a pre-determined allowable vertical error, otherwise known as the vertical alarm limit (VAL). A determination is made at step 550 to assess whether the vertical position error exceeds the VAL. If the determination is made that the vertical position error does exceed the VAL then, at step 560, a warning is issued alerting the user (i.e., pilot, vehicle operator, ground station attendant) that the vertical integrity of the incoming signal is unacceptable or unknown. The warning may come in any acceptable format including, but not limited to, an audible warning and/or a visible warning. If the determination is made that the vertical position error does not exceed the VAL then, at step 570, the incoming signal vertical integrity is deemed acceptable and continuous monitoring/checking of vertical integrity occurs for all incoming signals. In this context, the RAVIM algorithm provides vertical integrity for the incoming signal altitude, thereby enabling the vehicle operator to follow the precise maneuver path with a high degree of accuracy. For example, a WAAS signal supported by RAVIM integrity has been shown to be reliably accurate to within 2.0 meters.

Another aspect of the present invention, is the implementation of an internal consistency routine within the RAVIM algorithm. The internal consistency routine is invoked during the comparison of the vertical position error to the VAL. The internal consistency routine may also generate error values, which upon comparison to internal error limits may cause an internal failure alarm. In such instances, the algorithm can no longer perform an acceptable integrity calculation and, accordingly, the vehicle operator is warned that the incoming signal altitude component has unacceptable or unknown integrity due to the inability of the algorithm to perform consistently.

In another aspect of the present invention, the RAVIM algorithm provides vertical integrity in numerous other operational environments. For example, in the current environment in which internal WAAS vertical integrity is not available, the RAVIM algorithm can be implemented to provide vertical integrity for an otherwise unconfirmed WAAS signal. If and when internal WAAS vertical integrity becomes available, the RAVIM algorithm may operate as an additional level of integrity checks. Additionally, if countries outside of the United States provide for systems similar to WAAS, the RAVIM algorithm may provide a first or second level of vertical integrity check depending on the configuration of the system. It is also possible to implement the RAVIM algorithm to assess the vertical integrity of the independent altitude reading (i.e., the barometric signal) once vertical integrity of the incoming signal has been established.

The receiver-autonomous vertical integrity monitoring systems and methods herein described provide for determining the vertical integrity of an aircraft navigational signal, such as a WAAS signal, and provide timely warning to vehicle operators if the integrity of the signal is unacceptable or unknown. The system and methods are capable of determining the vertical integrity of an incoming signal without relying upon data embedded within the incoming signal itself. In addition, the system and methods of the present invention provide vertical integrity to vehicle operators in instances, such as when the a specific navigational signal is not operating, when a specific navigational signal is not available in a particular region, or when an aircraft is operating outside the geographic area covered by the aircraft navigational system.

That which is claimed:

1. A method for monitoring vertical integrity of an aircraft navigational signal, the method of comprising the steps of:

receiving an aircraft navigational signal that includes an altitude reading;

calculating a first variance defined as a difference between the altitude reading and a calculated altitude;

calculating a second variance defined as a difference between an independent altitude reading and a calculated altitude;

determining the absolute value of a difference between the first and second variances; and comparing the absolute value of a difference between first and second variances to a predetermined allowable vertical error.

2. The method of claim 1, wherein the aircraft navigational signal further comprises a Wide Area Augmentation System (WAAS) enhanced GPS signal.

3. The method of claim 1, further comprising the step of notifying a vehicle operator if the comparison determines that the difference exceeds the predetermined allowable vertical error limit.

4. The method of claim 3, wherein notifying a vehicle operator further comprises issuing a visual warning to the vehicle operator via a vehicle operator accessible display.

5. The method of claim 3, wherein notifying a vehicle operator further comprises issuing an audible warning to the vehicle operator.

6. The method of claim 1, further comprising the step of continuing the monitoring of further aircraft navigational signals for vertical integrity if the comparison determines that the difference fails to exceed the predetermined allowable vertical error limit.

7. The method of claim 1, wherein the independent altitude reading comprises a barometric altimeter reading.

8. The method of claim 1, further comprising the step of determining a calculated altitude.

9. The method of claim 8, wherein the calculated altitude represents a projected altitude for a vehicle at a given point along a maneuver path.

10. The method of claim 8, wherein determining the calculated altitude further comprises deriving a calculated altitude based on known position data.

11. The method of claim 10, wherein the known position data includes maneuver path angle, a first position point along the maneuver path, an elapsed time from the first position to a second position point and the horizontal distance from the first position point to the second position point.

12. The method of claim 1, further comprising the step of optimizing the predetermined allowable vertical limit error based upon one or more parameters chosen from the group consisting of a certified accuracy of the source of the independent altitude reading, error rates in the aircraft navigational signal, quantifiable characteristics of monitoring system hardware and regulations governing vehicle movement.

13. The method of claim 1, further comprising the step of conducting continuous internal consistency checks during the comparison of the difference to a predetermined allowable vertical error limit to assure method integrity.

14. A system for monitoring vertical integrity of an aircraft navigational signal, the system comprising:

an aircraft navigational signal receiver that receives signals having an altitude reading; and a processor that executes a vertical integrity monitoring algorithm to calculate a first variance defined as a difference between the altitude reading and a calculated altitude, calculate a second variance defined as a difference between an independent altitude reading and the calculated altitude, determine the absolute value of a difference between the first and second variances and compare the absolute value of the difference between first and second variances to a predetermined allowable vertical error.

15. The system of claim 14, wherein the aircraft navigational signal receiver further comprises a WAAS signal receiver.

16. The system of claim 14, further comprising a display terminal for visually notifying a vehicle operator if the comparison determines that the difference exceeds the predetermined allowable limit.

17. The system of claim 14, further comprising an audible alarm for audibly notifying a vehicle operator if the comparison determines that the difference exceeds the predetermined allowable limit.

18. The system of claim 14, further comprising a barometric altimeter for determining the independent altitude reading.

19. The system of claim 14, wherein the vertical integrity monitoring algorithm provides for calculating the calculated altitude based on known maneuver path data.

* * * * *